Dec. 6, 1927.
J. P. HARRISON, JR
1,651,453
TRUCK CAB
Filed May 22, 1926
Fig.1.
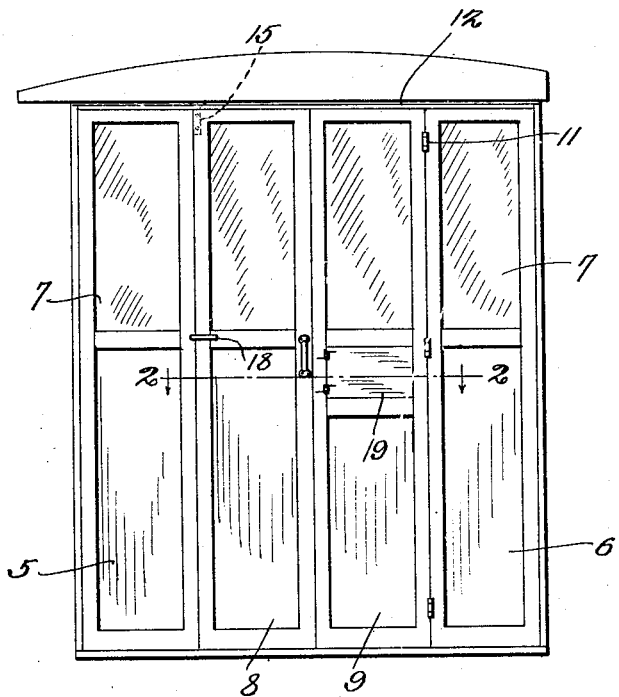
Fig.2.
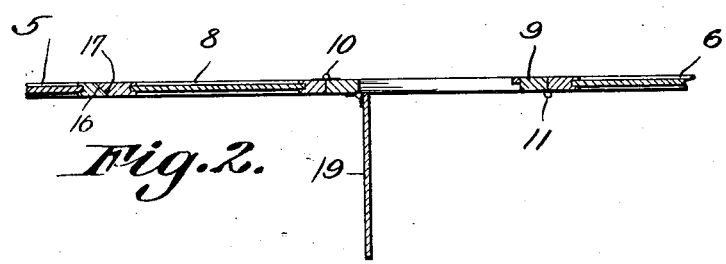
Fig.3.
Fig.4.
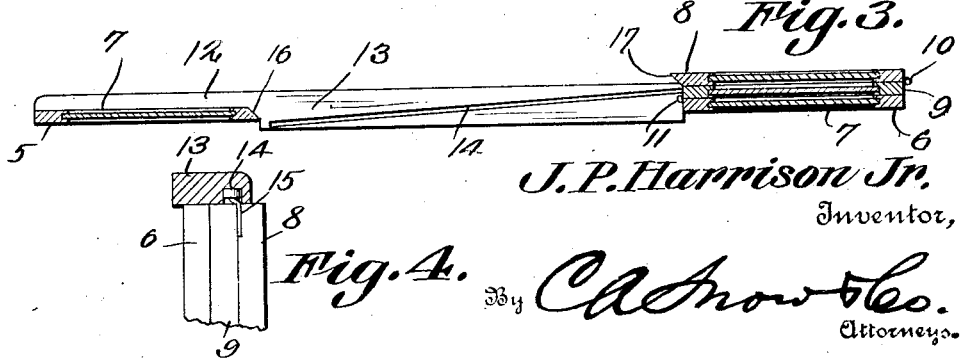
J. P. Harrison Jr.
Inventor,
By C. A. Snow & Co.
Attorneys.

Patented Dec. 6, 1927.

1,651,453

UNITED STATES PATENT OFFICE.

JOHN PROSSER HARRISON, JR., OF NEWPORT NEWS, VIRGINIA.

TRUCK CAB.

Application filed May 22, 1926. Serial No. 111,023.

The present invention has reference to cabs especially constructed for use on motor vehicles or trucks, the primary object of the invention being to provide a cab having hinged doors mounted in such a way that they may be easily operated, the construction being such that they will fold into close engagement with the side of the cab when moved to their open positions.

An important object of the invention is to provide means for guiding the closures to their inactive positions when pressure is brought to bear against the door from the interior of the cab, or when a pull is exerted from the exterior of the cab.

A further object of the invention is to provide a construction that will insure a tight fit between the sections of the door and door frame when the door is in its closed position.

A still further object of the invention is to provide a door construction for cabs, which may be folded into a small and compact article for shipment, eliminating any possibility of damage to the construction, while in transit.

Another object is to provide a device of this character which may be readily and easily secured to cabs now in general use, eliminating the necessity of making extensive alterations in the usual cab construction, to install the same.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Refering to the drawing:

Figure 1 is a side elevational view of a cab constructed in accordance with the invention, the doors thereof being closed.

Figure 2 is a sectional view taken on line 2—2 of Figure 1.

Figure 3 is a bottom plan view of the top moulding or guide strip forming a part of the invention.

Figure 4 is a sectional view through the moulding or guide strip.

Referring to the drawing in detail, the cab embodies a front panel 5 and a rear panel 6 arranged on each side thereof, which panels are supplied with glass sections 7 in the upper portions thereof.

The reference character 8 indicates the front door section and the reference character 9 indicates the rear door section, it being understood that these door sections are arranged on opposite sides of the cab, and are connected by hinges 10 arranged on the inner sides of the sections as shown by Figure 2.

The rear section 9 of each door has connection with the rear panel 6 associated therewith by means of the hinges 11, which hinges support the weight of the doors and permit them to operate in a manner to be hereinafter more fully described.

Disposed along the upper edge of the cab, is a bar 12 or guide strip which may be secured in any suitable manner, the bar embodying an inwardly extended portion 13 which is substantially wide as shown by Figure 3.

Formed in the under surface of the bar 12 is a groove 14 that extends diagonally across the wide portion 13 thereof as clearly shown by Figure 3, which groove accommodates the upwardly extended finger 15 that is carried by the forward section 8 of the door associated therewith, which finger guides the door section connected therewith to cause the same to be held against outward movement, as the doors are moved to their open positions.

As shown by Figure 2, the rear edge of each forward panel 5 is beveled as at 16, which beveled surface cooperates with the beveled surface 17 of the forward door section associated therewith to set up a binding action and insure a tight connection between these sections.

A suitable lock indicated at 18 is carried by each forward section 8 and is designed to increase the binding action between the forward door sections and front panels.

Each rear door section 9 is formed with a cut out portion to be closed by means of the hinged closure 19 associated therewith, suitable spring hinges being provided for connecting the closures to the door section for normally urging the closures to their closed positions after these closures have been released by the operator.

From the foregoing it will be obvious that due to this construction the doors may be readily moved to their open positions and folded against the rear of the cab as shown by Figure 3, whereupon the doors are out of the way and the operator is free to move to and from the cab.

I claim:

A cab body including front and rear panels, said panels being separated by door openings, a bar on each side of the body and having a wide contral portion, said bars being positioned adjacent to the upper edges of the panels and contacting with the forward panels to prevent lateral movement thereof, shoulders disposed at the ends of the wide portion of each bar and engaging the edges of the panels to hold the panels in spaced relation with each other, said wide portion of each bar having an obliquely disposed groove, doors including pivotally connected sections, operating to close the door openings, fingers extending upwardly from the doors and disposed within the obliquely disposed grooves to guide the doors while being operated to open or close the doors.

In testimony that I claim the foregoing as my own, I have hereto affixed my signature.

JOHN PROSSER HARRISON, Jr.